Z. D. WATERS.
Grain Drill.

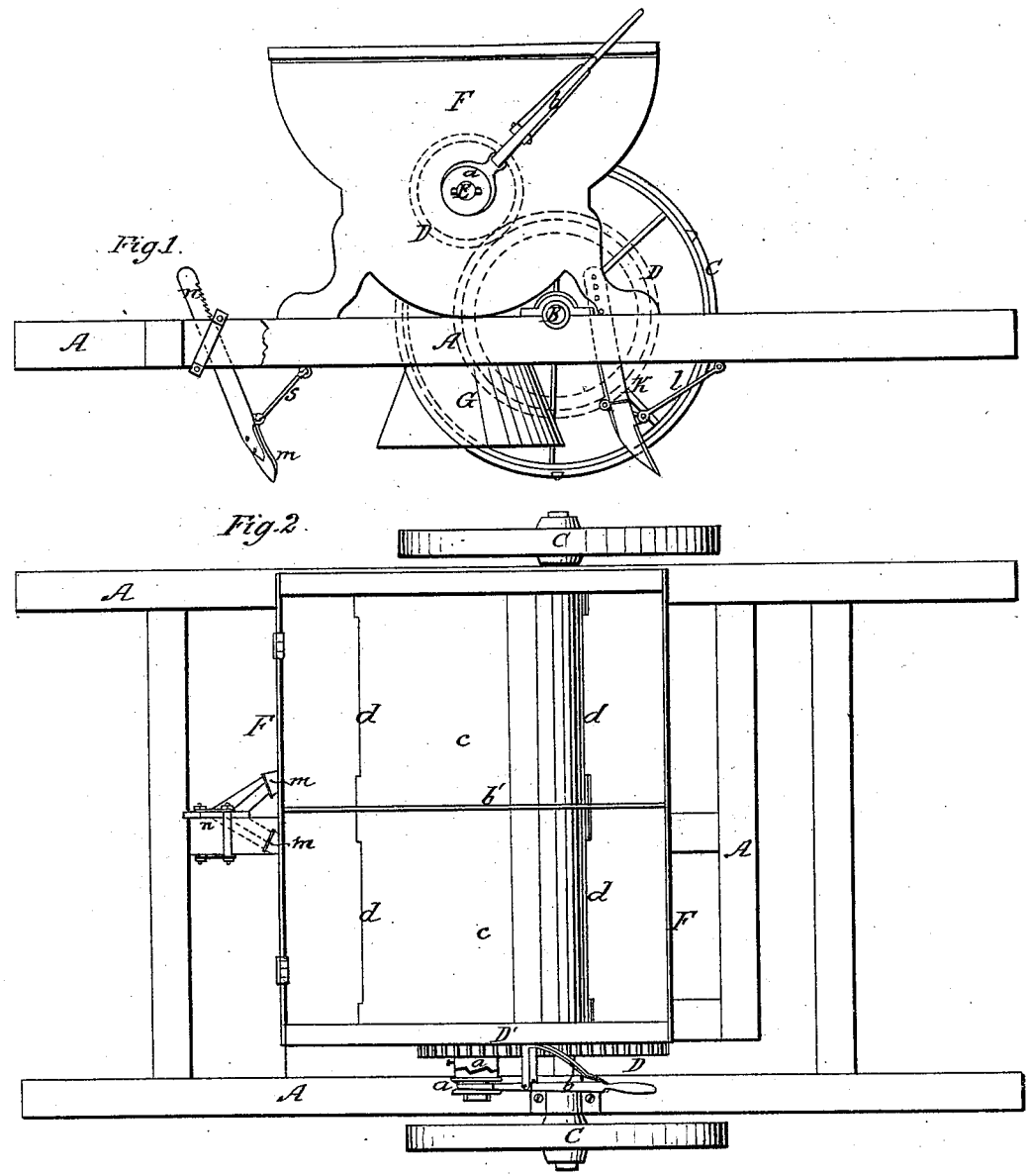

No. 53,909.

2 Sheets—Sheet 2.

Patented Apr. 10, 1866.

Witnesses:
R. H. Campbell
Edw. Schafer

Inventor:
Z. D. Waters
by his Atty
Mason Fenwick & Lawrence

UNITED STATES PATENT OFFICE.

Z. D. WATERS, OF BROOKVILLE, MARYLAND.

IMPROVEMENT IN SEEDING-MACHINES.

Specification forming part of Letters Patent No. 53,909, dated April 10, 1866.

*To all whom it may concern:*

Be it known that I, Z. D. WATERS, of Brookville, Montgomery county, State of Maryland, have invented a new and Improved Seeding-Machine; and I do hereby declare that the following is a full, clear, and exact description thereof, reference being had to the accompanying drawings, making a part of this specification, in which—

Figure 3:
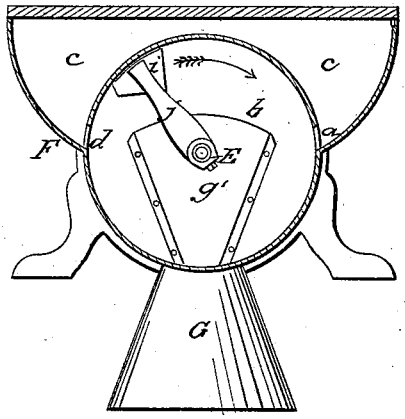
Figure 4:
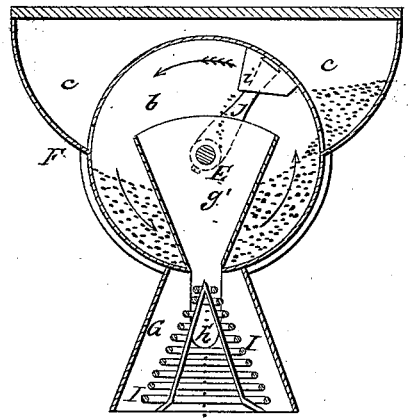
Figure 5:
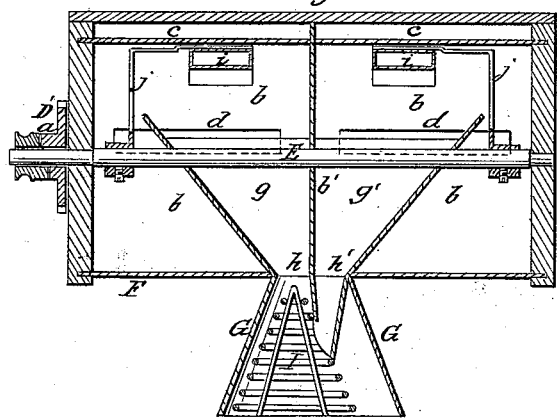
Figures 7, 8:
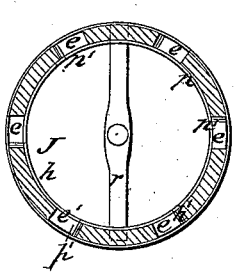
Figure 6:
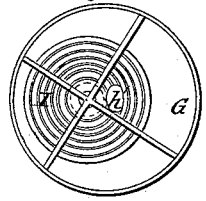
Figure 9:
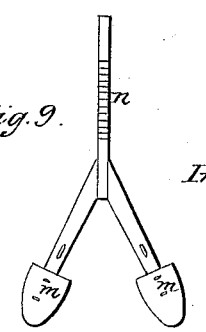

Figure 1, Sheet 1, is a side elevation of the improved seeding-machine with one of the transporting-wheels removed. Fig. 2 is a plan view of the machine with the cover of the hopper removed. Fig. 3, Sheet 2, is a vertical transverse section of the hopper. Fig. 4, Sheet 2, is a vertical transverse section through the hopper and its distributer. Fig. 5 is a longitudinal section taken in a vertical plane through the center of the two hoppers and the distributer. Fig. 6 is a bottom view of the distributer. Figs. 7 and 8 are views of a wheat-discharger, to be used instead of the corn-dropper shown in Figs. 3, 4, and 5. Fig. 9 is a front view of the coverers, which are arranged in rear of the drill-tooth.

Similar letters of reference indicate corresponding parts in the several figures.

This invention relates to certain novel improvements on seeding-machines, for the purpose of obtaining a more perfect and equable discharge of seed and fertilizing substances from a hopper without liability of the dropping devices getting out of order or becoming clogged.

This invention consists in discharging seed or fertilizing substances from a hopper by means of a revolving cup, which is inclosed within this hopper and operated so as to elevate the seed in proper quantities and deposit the same into a vessel which leads out of the hopper, as will be hereinafter described.

It also consists in providing for discharging fertilizing substances and seeds from two hoppers at the same time and conducting the same through a scattering device in such manner that the seed will pass freely through this device as they fall from the hopper, while the fertilizer will be scattered about the seed in the drills, as will be hereinafter described.

It also consists in constructing the hopper in such manner that the seed shall not rise above the plane of the top of the vessel which receives the seed from the revolving seed-cups, thus preventing the wasting of the seed from the hopper, as will be hereinafter described.

To enable others skilled in the art to understand my invention, I will describe its construction and operation.

In the accompanying drawings, A represents the frame of the machine, and C C are the transporting-wheels, which are keyed to their axle B, so that when the machine is drawn along this axle will be rotated. Upon this axle a large spur-wheel, D, is keyed, which engages with the teeth of a pinion-wheel, D', on a shaft, E, that passes through the hopper-box F, as shown in Fig. 5. This wheel D' is acted upon by means of a clutch, $a$, and lever $b$, so that the attendant can stop or start the seed-dropping devices at pleasure while the machine is being drawn along.

The hopper-box F consists of a cylinder, which is centrally divided into two apartments, $b\ b$, by means of a partition, $b'$. Above this cylinder are two apartments, $c\ c$, which communicate with the cylindrical apartments $b\ b$ by means of the oblong openings $d\ d$, as shown in Figs. 3, 4, and 5. Within the cylindrical chambers $b\ b$ are two hoppers, $g\ g'$, which are funnel-shaped, and which are arranged against the partition $b'$, so that they discharge through small openings $h\ h'$ into an inverted funnel-guard, G, as shown in Fig. 5.

The seeds are put into the upper chambers of the hopper-box, and they run down through the openings $d\ d$ into the cylindrical chambers $b\ b$ and fill these chambers on a level with said openings, but not above the upper ends of the funnel-discharging vessels $g\ g'$. The seeds are elevated from the bottoms of the chambers $b\ b$ and deposited in suitable quantities in the vessels or hoppers $g\ g'$ by means of revolving cups $i\ i$, which are suitably secured to arms $j\ j$, that are fastened to the shaft E. As the shaft E is rotated the cups $i\ i$ are caused to dip into the seed in the chambers $b\ b$ and elevate the seed in suitable quantities and deposit the same into the hoppers $g\ g'$, as shown in Fig. 4. The cups $i\ i$ are adapted for planting corn, and they may be constructed of any required capacity, according to the number of grains which it is desired to discharge at each revolution of the cups.

The double hoppers are intended for planting or sowing seeds and a fertilizing substance at the same time; but it is obvious that a single hopper can be used when it is not desired to sow the fertilizing substance.

The construction of the hoppers and the devices for elevating and discharging the seeds and fertilizer is precisely alike; but as it is desirable to scatter the fertilizer, I arrange beneath the opening h of one hopper, g, a cone of hoops or rings, I, which forms a kind of grating, over which the fertilizer is scattered as it falls to the ground. The seed is discharged through the cone of hoops I by means of the tubular opening h' of the seed-hopper g', and thus the seeds are prevented from being scattered over said cone.

It is important to prevent the seed and fertilizer from being scattered too much, and to this end the jacket or inverted cone G is used, and extended beneath the bottom of the hopper-box sufficiently far to inclose the sides of the cone I and prevent the seed and fertilizer from being blown about by winds.

For sowing wheat I employ a ring or hoop, J, (shown in Figs. 7 and 8,) instead of the cups i i, or the cup i may be used for discharging the fertilizer from one hopper and the ring J used for discharging grain from the other hopper. This ring has a number of seed-cups formed in it, as shown at e e e, which may be increased or diminished in size by means of an adjustable hoop, p, having projections p', applied within the seed-cups, as shown in Fig. 7. By adjusting the hoop p all the seed-cups can be enlarged or diminished as may be desired.

The arm r, extending diametrically across the hoop J, is used for attaching this hoop to the shaft E. This hoop is equal in its diameter to the interior diameter of the chamber b, within which it revolves, and the grain is elevated and discharged into the hopper g or g' by the cups e e, as described, for the corn-discharging cups i i.

In front of the cone-guard G, and attached to the frame A, is a drill-tooth, K, the standard of which is constructed of two parts. The upper part passes through one of the transverse beams of the frame A, and can be adjusted up or down and secured in any desired position. The lower part of this standard has a suitable shovel or tooth secured to it. The two portions of the said standard are hinged together, so that when released from a forward brace, l, the lower portion of the standard can swing freely backward. Now, by attaching the brace l to the tooth and frame by means of wooden pins, which will break when this tooth meets with any heavy obstruction, all liability of injury to the tooth or its standard will be prevented.

In rear of the cone-guard G are two coverers, m m, the beams of which are inclined toward each other and secured rigidly to a standard, n, which is suitably secured to the frame A in a line with the drill-tooth K. The standard n can be adjusted up or down and secured in any desired position. The two shovel-standards which diverge from the lower end of the central standard, n, are braced against backward thrust by means of the rods S. By thus securing the shovels or coverers m m to a forked standard it will be seen that both can be adjusted and secured simultaneously, besides which one will act as a brace for the other.

Having thus described my invention, what I claim as new, and desire to secure by Letters Patent, is—

1. The arrangement of one or more seed-cups within a hopper-box, F, in such manner that said cup or cups shall elevate the seed above the bottom of the hopper and discharge the seed into a funnel, g, which conducts it out of the hopper, substantially as described.

2. Conducting the seed and fertilizer from two funnel-hoppers, g g', into an inverted funnel-shaped guard, G, substantially as described.

3. The construction of the seed or fertilizer hopper of a cylindrical chamber, b, communicating with an upper receiver through slotted opening d, substantially as described.

4. The combination of the elevated receiving-hopper g with the cylindrical vessel b and one or more revolving seed-elevators, substantially as described.

5. The conical hooped scatterer I, arranged beneath the discharging-apertures of the hoppers g g' and surrounded by a conical skirt or guard, G, substantially as described.

6. Extending the upper ends of the receiving-hoppers g g' above the plane of the apertures d d leading into the cylindrical chambers b b, substantially as and for the purposes described.

7. Providing for discharging seed or fertilizing substances, or both, from a hopper by means of revolving elevators or cups, which are entirely inclosed within said hopper, substantially in the manner described.

8. Attaching the coverers m m to a forked standard, which is constructed substantially as described.

Z. D. WATERS.

Witnesses:
R. T. CAMPBELL,
EDW. SCHAFER.